Nov. 5, 1929.                B. E. ROSE                    1,734,347
                          REVOLVING SCRAPER
                       Filed Dec. 17, 1926        3 Sheets-Sheet 1
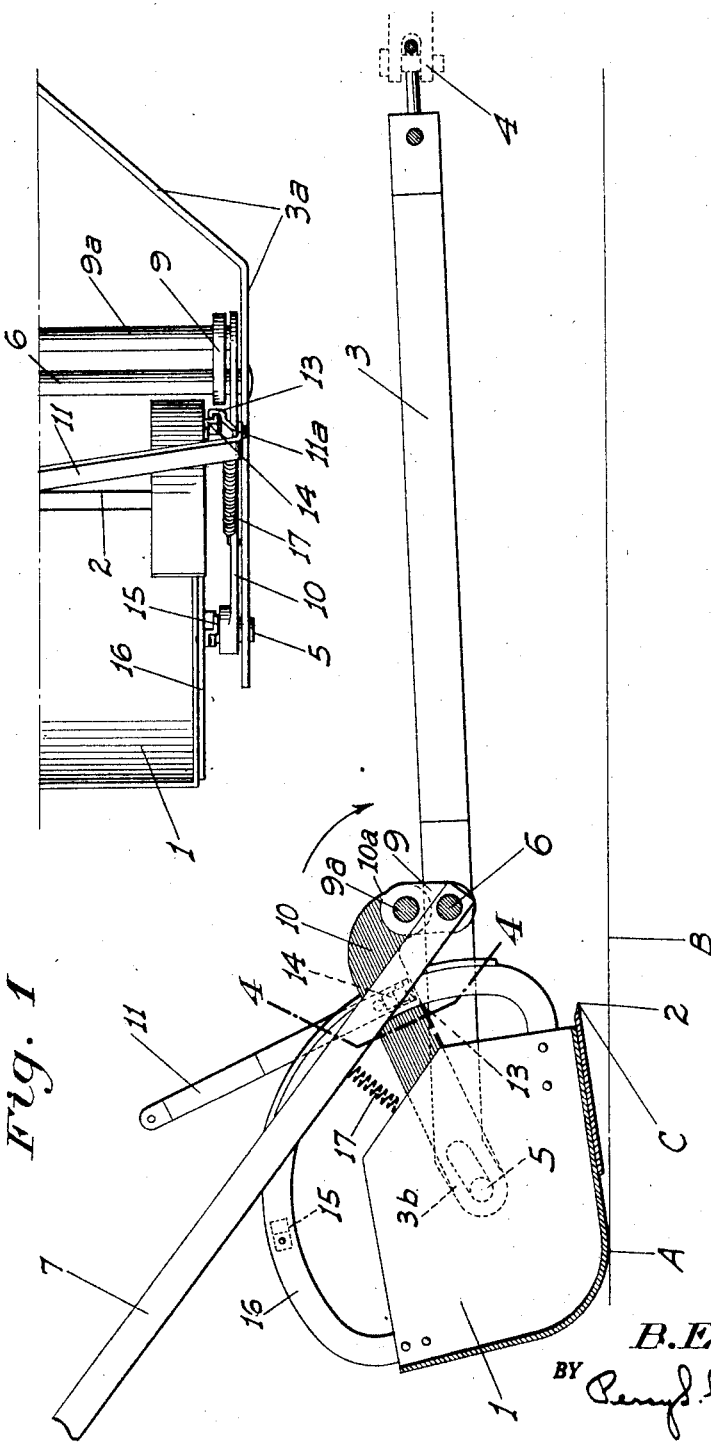
INVENTOR.
B. E. Rose
BY
ATTORNEY.

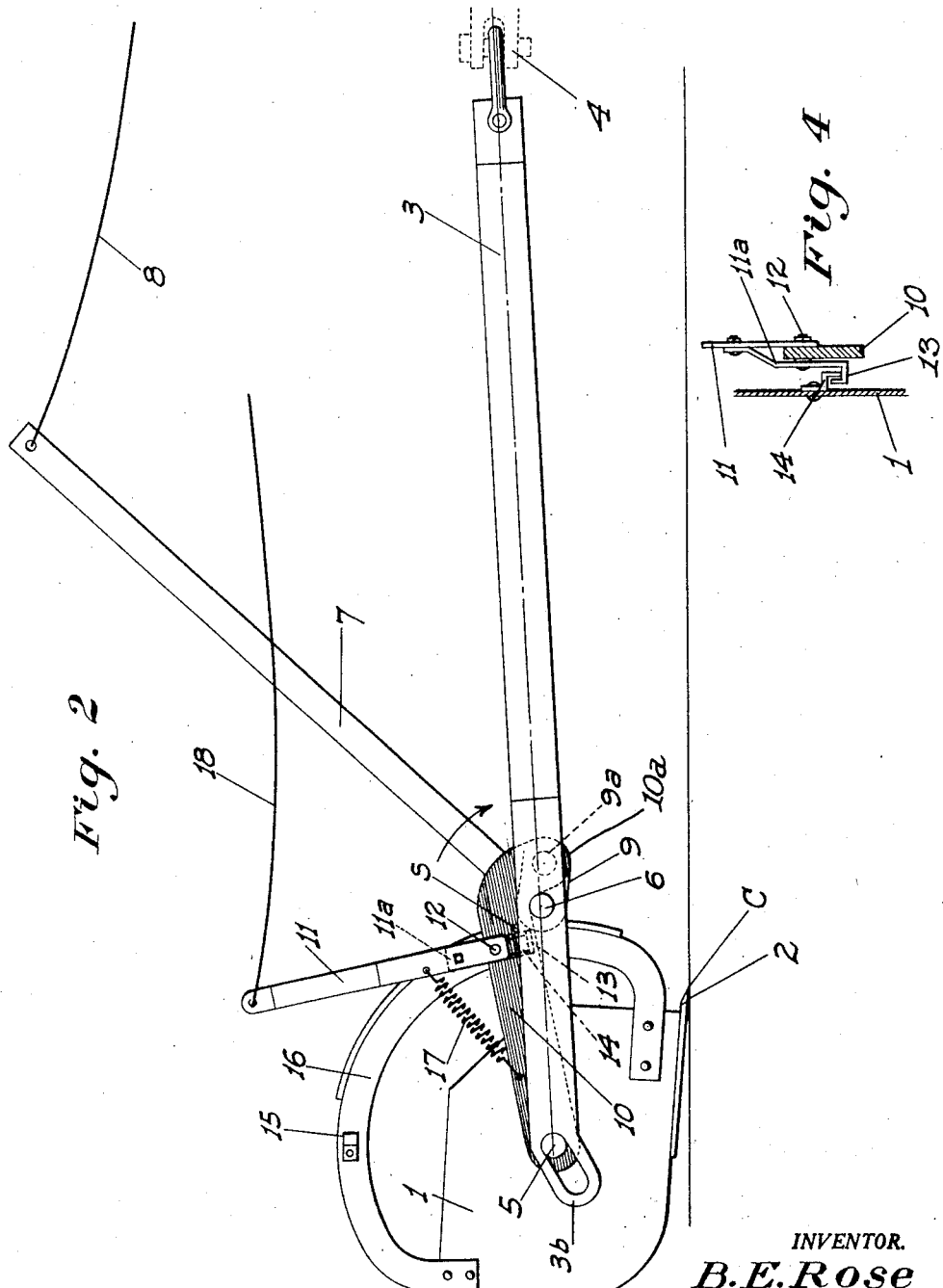

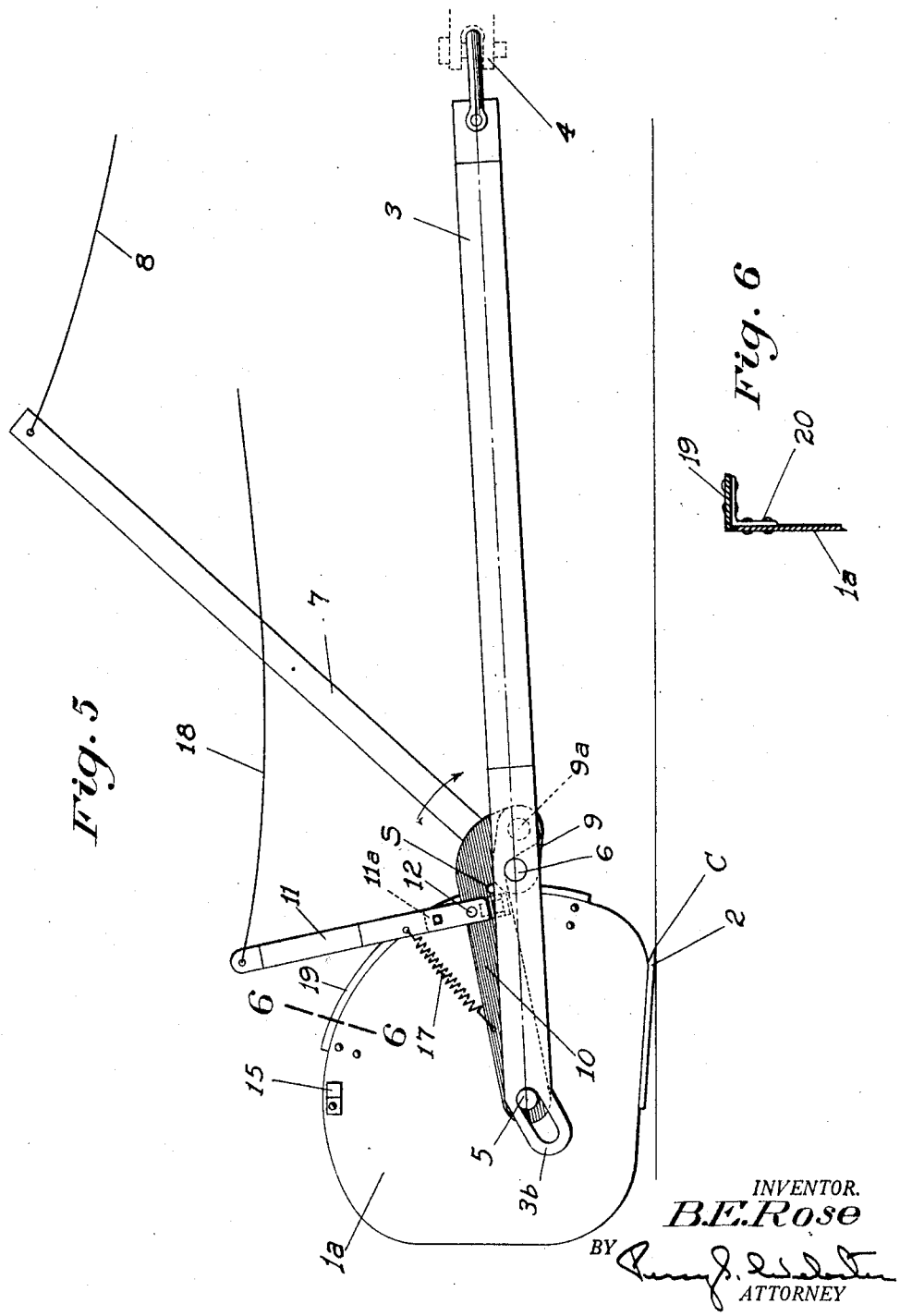

Patented Nov. 5, 1929

1,734,347

UNITED STATES PATENT OFFICE

BRUCE E. ROSE, OF STOCKTON, CALIFORNIA

REVOLVING SCRAPER

Application filed December 17, 1926. Serial No. 155,409.

This invention relates to improvements in earth working tools and particularly to that type commonly known as a revolving Fresno scraper.

The main object of the invention is to produce a scraper which can be readily transported from place to place when empty or loaded and then by the operation of a simple lever and toggle joint mechanism may be, when empty, thrown to loading position, and when loaded may, by a reverse movement of said lever and toggle mechanism, be returned to transporting position. This return to transporting position will be facilitated by the draft on the scraper, thus enabling the loaded scraper to be very easily handled from loading to transporting position without a tremendous amount of manual effort and without the necessity of stopping the tractor or other draft means to which the scraper is connected.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a longitudinal sectional view of the scraper in transporting position.

Fig. 2 is a side elevation of the same in loading position.

Fig. 3 is a top plan view of a one-half section of the scraper showing the parts as they appear when the scraper is in the loading position shown in Fig. 2.

Fig. 4 is a fragmentary cross section substantially on the line 4—4 of Fig. 1, showing the preferred form of bowl catch means used.

Fig. 5 is a side elevation of a scraper showing a modified form of bowl construction.

Fig. 6 is a fragmentary cross section on the line 6—6 of Fig. 5.

Referring now more particularly to the characters of reference on the drawings, and particularly at present to Figs. 1 to 4, the numeral 1 designates the scraper bowl which is of usual type and having the lower cutting edge 2.

The numeral 3 designates the draft beam for connection at its outer end with the tractor or other motive power as at 4. The draft beam 3 has branched arms $3^a$ which are provided at their inner ends with down-turned slotted extensions $3^b$ movable over pintles 5 fixed on the ends of the scraper bowl 1.

Mounted for turning action in the arms $3^a$ and extending across from one to the other in front of the scraper bowl is a turnable shaft 6 rigidly fixed to which is an operating lever 7, having at its upper end a pull rope 8 or like operating element.

Also rigidly fixed to the shaft 6 are two links 9 pivoted in the upper end of each of which is a drawbar 10. These drawbars extend to and are pivotally mounted on the pintles 5.

The draw bars 10 are curved at their forward ends at substantially right angles to form angled extensions $10^a$ to which the links 9 connect, so that with the turning of the shaft 6 the connections of the links 9 with the extensions $10^a$ may be turned from points above to points below the longitudinal center of the shaft 6 so as to shift the line of draft on the bowl as will presently appear.

Projecting upwardly from and pivoted onto the outside of the drawbars 10 are lever arms 11, converging to meet each other at their upper ends. Arms $11^a$ are secured to the arms 11 adjacent their lower ends, and depend inwardly of the drawbars, being pivoted onto said drawbars in common with the arms 11 as at 12. The lower ends of the arms $11^a$ are provided with hook lugs 13 which normally engage either set of longitudinally spaced stop-lugs 14 and 15 mounted on the runners 16 of the bowl 1. This normal position of the lever and connected parts as just described is maintained by a spring or like yieldable member 17 interposed between the lever arms $11^a$ and the drawbars 10.

The relative position of the lever 7, links 9, drawbars 10 and their connected parts is such that when the lever 7 is moved to its rearmost position as shown in Fig. 1, the links 9 act on the drawbars 10 to lift them upwardly at their forward ends and move them backwardly and downwardly at their rear ends. This action, through the medium of the lugs 13, tilts the bowl on its pivotal point A so that the forward end of the bowl with its cutting edge 2 is lifted and held above the ground level B. Thus in this position the bowl may be moved along on its point A either empty or when loaded to transport the scraper from point to point without having it cut into the ground. Under these conditions the pull of the draft means on the draft member 3 will pull against the shaft 6, which action will cause the links 9 to maintain their pressure against the drawbars 10 and automatically hold the parts in this transporting position. At this time the pintles 5 are in the lower ends of the slotted extensions 3$^b$ and the direct draft on the bowl will be on a line from the power unit through the draft beam 3—3$^a$ and pintles 5.

When the parts are in this transporting position described and the bowl is empty and it is desired to load the bowl, the operator pulls on the element 8 to shift the lever 7 from its rearward position shown in Fig. 1 to its forward position shown in Fig. 2. This action turns the shaft 6 and moves the links 9 forwardly and causes them to pull on the drawbars 10. Since the links 9 move in an arc, this movement will cause them to pull the drawbars 10 forwardly and downwardly in the direction of the arrows shown in Figs. 1 and 2, until the pivotal points 9$^a$ between the links 9 and the drawbars 10 are moved to a point below the longitudinal axis of the shaft 6, as shown by the dotted lines in Fig. 2.

This action will of course pull the pintles 5 to the forward ends of the slotted extensions 3$^b$ and lower the position of the drawbars 10 relative to the bowl, and the forward draft on the bowl will cause it to pivot on its point A until that pivot point shifts to the point C, whereupon the stops 14 will follow down against the lugs 13 and the cutting edge 2 will engage the earth, and the forward draft of the motive power will cause the cutting edge of the bowl to engage with the ground and start to load the bowl. This position will be automatically maintained for the reason that the pivot points 9$^a$ will be below the axis of the shaft 6, and the draft will be directly against the said shaft 6 so that as long as the power is applied the scraper will be held in such loading position. At this time the direct draft on the scraper bowl will be on the shaft 6, against the links 9, pivots 9$^a$ and draw bars 10 to the pintles 5. After the bowl is loaded the operator gives the lever 7 a slight push backwards until the centers 9$^a$ get above the axis of the shaft 6, whereupon the pull on the shaft 6, coupled with the drag of the load in the bowl pulling on the drawbars 10, will automatically cause the links to continue their upward movement to return all the parts to transporting position again.

When the bowl is thus loaded and it is desired to empty the same, the lever 11 may be given a pull by means of a rope or other pulling element 18 to disengage the lugs 13 from the stops 14. As soon as the disengagement takes place the forward pull on the bowl will cause it to pivot forwardly, and the cutting edge 2 will engage the ground and the whole bowl will revolve forwardly onto the runners 16. If it is only desired to empty an not to spread the load, this disengagement between the lugs 13 and stops 14 will be held until the bowl has revolved clear around into normal position again. If, however, a spreading action is desired, the lugs 13 may be allowed to drop back to normal position under the influence of the spring 17 so as to engage the rear or secondary stops 15 on the runners 16, which will maintain the scraper with its bottom side in vertical position, so as to act as a spreading element.

The return action of the levers 11 under the influence of the spring 17 is limited by means of stop pins S on the sides of the drawbars 10 against which the arms 11$^a$ strike when the lugs 13 are in proper normal position with either the stops 14 or 15.

In the form of structure shown in Figs. 5 and 6, all the parts are identical in construction and operation as those above described, except the bowl itself. In this form of the bowl, however, the side runners are omitted, and the side plates 1$^a$ of the bowl are enlarged and cut so that their upper edges conform to the curvature of the runners, and lie in a plane corresponding to that of the outer or upper edges of such runners, the plates extending unbroken from the bottom of the bowl to the curved edges. The usual ground-bearing shoes 19 are then disposed in the proper location about the curved edges of the bowl-sides, and rest thereon, being secured in place by angle brackets 20 disposed at intervals between the inner faces of the shoes and bowl-sides. This arrangement not only provides a bowl of greater carrying capacity for a given width, but cheapens the construction considerably, since the number of separate parts is reduced, and consequently the time necessary for assembling operations is likewise cut down.

In view of the foregoing description it will be readily apparent that by means of shifting the center of draft through the medium of the toggle joint construction described, the bowl can be quickly shifted from transporting to loading position and vice versa, all with a minimum of manual labor, and using the power of draft means to as great an extent as possible. Also there is a very minimum number of parts required to carry out the desired operation, none of which are arranged as to interfere greatly with the operation of the scraper bowl itself.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A scraper including a bowl, a draft element having slots in its ends adjacent the bowl, pintles on the bowl fitting into said slots, drawbars mounted on the pintles, means flexibly connecting the outer ends of the drawbars to the draft element, and means to move and automatically hold said outer ends of the drawbars in position on either side of the longitudinal center line of the draft element.

2. A scraper including a bowl having its bottom normally tilted at an angle to the horizon, a primary draft member acting directly on the bowl to drag it in such tilted position and means to alter the center line of such draft and shift the angle of the bowl, such means comprising draw bars pivoted to the bowl and normally extending at an angle above the center line of the primary draft member, means on the bowl engaging the draw bars ahead of the pivots and means to shift the angle of the draw bars from such position above the center line of the primary draft to a point below such center line.

3. A scraper bowl having pivot pintles, a draft beam having downwardly bent slotted extensions at its rear end, the pivot pintles normally resting in the lower ends of the slotted extensions, and means connected with the draft beam to draw the pintles from the lower to the upper ends of the slotted extensions to tilt the bowl.

4. A scraper bowl having pivot pintles, a draft beam having downwardly bent slotted extensions at its rear end, the pivot pintles normally resting in the lower ends of the slotted extensions, and means connected with the draft beam to draw the pintles from the lower to the upper ends of the slotted extensions to tilt the bowl, such means including draw bars mounted on the pintles and a toggle joint between the other ends of the draw bars and the draft beam.

5. A scraper bowl having pivot pintles, a draft beam having downwardly bent slotted extensions at its rear end, the pivot pintles normally resting in the lower ends of the slotted extensions, and means connected with the draft beam to draw the pintles from the lower to the upper ends of the slotted extensions to tilt the bowl, such means including draw bars mounted on the pintles, a shaft journaled on the beam and links fixed to the shaft and pivoted to the draw bars and means to turn the shaft.

6. A scraper including a draft beam, a bowl, pintles projecting from the bowl and pivoted on the draft beam and mounted for longitudinal movement relative thereto, draft bars pivoted to the pintles and having angular extensions at their outer ends, a shaft turnable on the draft beam, and links fixed to the shaft and pivoted to the extensions whereby with the turning of the shaft the extensions may be moved from one side to the other of the longitudinal center line of the shaft.

7. A scraper including a draft beam, a bowl pivoted on the draft beam and mounted for longitudinal movement relative thereto, draft bars pivoted to the bowl and having angular extensions at their outer ends, a shaft turnable on the draft beam, and links fixed to the shaft and pivoted to the extensions whereby with the turning of the shaft the extensions may be moved from one side to the other of the longitudinal center line of the shaft, lugs on the draw bars and lugs on the bowl engaging the lugs on the draw bars.

8. A scraper including a draft beam, a bowl pivoted on the draft beam and mounted for longitudinal movement relative thereto, draft bars pivoted to the bowl and having angular extensions at their outer ends, a shaft turnable on the draft beam, and links fixed to the shaft and pivoted to the extensions whereby with the turning of the shaft the extensions may be moved from one side to the other of the longitudinal center line of the shaft, lugs on the draw bars and lugs on the bowl engaging the lugs on the draw bars, and means to disassociate such lugs.

9. A scraper including a bowl, a draft element pivoted on the bowl for limited longitudinal movement relative thereto, drawbars pivoted on the bowl, means applied to the drawbars for moving the same to slide the bowl longitudinally of the draft element while causing the bowl to be tilted relative thereto, and releasable catch means between the drawbars and bowl independent of the connection of the drawbars with the bowl.

10. A scraper including a bowl, a draft element pivoted on the bowl for limited longitudinal movement relative thereto, drawbars pivoted on the bowl, means applied to the drawbars for moving the same to slide the bowl longitudinally of the draft element while causing the bowl to be tilted relative thereto, releasable catch means between the drawbars and bowl, and means for releasing said catch means at any position of the drawbars and without disturbing the same.

11. A scraper including a bowl, a draft element pivoted on the bowl for limited longitudinal movement relative thereto, drawbars pivoted on the bowl, means to shift the drawbars and bowl forwardly or rearwardly relative to the draft element, and means causing the bowl to then assume positions with its scraping edge tilted down or up respectively.

12. A scraper including a bowl, a draft element pivoted on the bowl for limited longitudinal movement relative thereto, drawbars pivoted on the bowl in connection with the draft element, a transverse shaft mounted in said element, links fixed on the shaft and pivoted on the forward ends of the drawbars, and means for rotating the shaft to shift the drawbars and bowl forwardly to their limit of movement relative to the draft element; the shaft being then on the center line of draft from the bowl to the front end of the draft element, and the forward ends of the drawbars being so arranged as to be then ahead of the shaft and below said center line whereby to be automatically locked against retractive movement.

13. A scraper including a bowl, a draft element pivoted on the bowl for limited longitudinal movement relative thereto, drawbars pivoted on the bowl, means to shift the drawbars and bowl forwardly, and means included with said shifting means whereby the drawbars will then be automatically held against retractive movement.

14. A scraper including a bowl, a draft element pivoted on the bowl for limited longitudinal movement relative thereto, drawbars pivoted on the bowl in connection with the draft element, means to shift the drawbars and bowl forwardly, and means included with said shifting means whereby the forward ends of the drawbars will then be positioned and automatically held past dead center relative to the line of draft from the bowl along the draft element.

In testimony whereof I affix my signature.

BRUCE E. ROSE.